US011308539B2

(12) United States Patent
Grebenikof et al.

(10) Patent No.: US 11,308,539 B2
(45) Date of Patent: Apr. 19, 2022

(54) SYSTEMS AND METHODS OF PRICE COMPARISON AND OPTIMIZATION BY NOVEL SEARCH ENGINES

(71) Applicant: Twister S.A.S., Rueil-Malmaison (FR)

(72) Inventors: Michel Grebenikof, Dubai (AE); Vladyslav Oliinyk, Kiev (UA)

(73) Assignee: Twister S.A.S., Rueil-Malmaison (FR)

( * ) Notice: Subject to any disclaimer, the term of this patent is extended or adjusted under 35 U.S.C. 154(b) by 0 days.

(21) Appl. No.: 16/911,403

(22) Filed: Jun. 25, 2020

(65) Prior Publication Data

US 2020/0410566 A1 Dec. 31, 2020

Related U.S. Application Data

(60) Provisional application No. 62/958,887, filed on Jan. 9, 2020, provisional application No. 62/866,695, filed on Jun. 26, 2019.

(51) Int. Cl.
*G06Q 30/06* (2012.01)
*G06F 16/9537* (2019.01)
(Continued)

(52) U.S. Cl.
CPC ..... *G06Q 30/0629* (2013.01); *G06F 16/9537* (2019.01); *G06Q 30/0283* (2013.01); *G06Q 50/14* (2013.01)

(58) Field of Classification Search
CPC ........... G06Q 30/0629; G06Q 30/0283; G06Q 30/0611; G06Q 50/14; G06F 16/9537; H04L 63/0421
See application file for complete search history.

(56) References Cited

U.S. PATENT DOCUMENTS 8,423,541 B1  4/2013  Baluja
9,904,964 B1 * 2/2018  O'Neil-Dunne ... G06Q 30/0635
(Continued)

OTHER PUBLICATIONS

Interface design in computer-based language testing. Fulcher, Glenn. Language Testing; London vol. 20, Iss. 4, (Oct. 2003): 384-408. See p. 394. (Year: 2003).*

(Continued)

*Primary Examiner* — Michael Misiaszek
(74) *Attorney, Agent, or Firm* — Eric L. Lane; Green Patent Law

(57) ABSTRACT

Systems and methods of dynamic searching, price comparison, and optimization utilizing novel search engines are provided. A search engine enables searching across multiple virtual private servers in a tailored group of geographical locations. Back-end architecture including one or more databases and tracking tools compares prices of a product or service in the tailored group of geographical locations. The system provides the lowest price for the product or service in the tailored group of geographical locations to a user in any geographical location. The search engine may be provided via a front-end mobile application. A user can drag a sticker icon over any search result to request price information for the product or service shown in the search result and be directed to a pop-up showing the price information for the product or service and/or a website providing the lowest price for the product or service. Disclosed systems and methods are particularly useful for people shopping for flights and other travel services.

16 Claims, 21 Drawing Sheets

(51) Int. Cl.
 *G06Q 30/02* (2012.01)
 *G06Q 50/14* (2012.01)

(56) References Cited

U.S. PATENT DOCUMENTS

| | | |
|---|---|---|
| 2006/0200455 A1 | 9/2006 | Wilson |
| 2009/0150343 A1* | 6/2009 | English ................. G06F 16/951 |
| 2009/0210416 A1* | 8/2009 | Bennett ................... G06F 16/29 |
| 2012/0023570 A1* | 1/2012 | Gorodyansky ..... H04L 63/0407 |
| | | 726/12 |
| 2015/0106856 A1* | 4/2015 | Rankine ............. H04N 21/4725 |
| | | 725/60 |
| 2015/0134372 A1* | 5/2015 | Lopez Ruiz ........... G06Q 10/02 |
| | | 705/5 |
| 2020/0151786 A1* | 5/2020 | Butters ................. G06Q 30/00 |

OTHER PUBLICATIONS

Anonymous, Chillglobal: Can I avoid price discrimination with a VPN? Jul. 19, 2017, https://www.chillglobal.com/questions/can-i-avoid-price-discrimination-with-a-vpn.

N. Saxena, Web Search Query Privacy Eval. Query Obfuscation and Anonymizing Networks, Jan. 1, 2014, https://citeseerx.ist.psu.edu/viewdoc/download?doi=10.1.1.1024.5512&rep=rep1.

International Search Report and Written Opinion in related International Patent Application No. PCT/EP2020/068144.

* cited by examiner

SYSTEMS AND METHODS OF PRICE COMPARISON AND OPTIMIZATION BY NOVEL SEARCH ENGINES

CROSS-REFERENCE TO RELATED APPLICATIONS

This application is a non-provisional of and claims priority to U.S. Patent Application No. 62/958,887, filed Jan. 9, 2020, and U.S. Patent Application No. 62/866,695, filed Jun. 26, 2019, each of which is hereby incorporated by reference in its entirety.

FIELD

The present disclosure relates to dynamic searching system architecture including search engines, databases, and tracking tools for price comparison shopping as well as a mobile application for users of the system.

BACKGROUND

All our online activities are used for commercial purposes and form an online profile used not only by advertisers to design personal advertisements for us as individuals, but also by providers to adjust purchases prices for products and services. As a result, the exact same product or service may be priced differently for different individuals based on their online profiles, including geographic location information. Other information used to generate such disparities in price may include nationality, language, currency, connection type, and online search habits.

This price differentiation is common for travel services and is quite evident in data for airline ticket purchases. If two people have different online profiles, they are likely to pay different prices for the same airline ticket even when the tickets are for the same airline, same class, and same booking or purchase times. Currently, individuals are limited to searching from their geographical location and bound by the online profiles to the prices companies set for them.

Therefore, there exists a need for a system that would allow a shopper to browse prices for products or services without being limited by their online profile. There is a need for a price comparison search engine that facilitates searching for products or services in multiple different geographical locations. There is a need for a system and method of dynamic searching, price comparison, and price optimization that enables searching across multiple private servers in multiple geographical locations.

SUMMARY

The present disclosure, in its many embodiments, alleviates to a great extent the disadvantages of known online shopping systems by providing systems and methods that enable dynamic searching and price comparison shopping across multiple virtual private servers in a tailored group of geographical locations. The innovative approaches described herein represent the future of online search. Exemplary embodiments use smart algorithms combined with a unique user experience to find the cheapest flights online and can be used to compare prices for any product or service and find the cheapest product or service offered online. Disclosed systems and methods unlock all barriers of online search by comparing flight offers using all possible variables, and in the process make the cheapest price available to everyone.

Exemplary systems of dynamic searching comprise a search engine and back-end architecture. The search engine enables searching across multiple virtual private servers in a tailored group of geographical locations. The back-end architecture includes one or more databases and tracking tools comparing prices of a product or service in the tailored group of geographical locations. The system provides the lowest price for the product or service in the tailored group of geographical locations to a user in any geographical location. The tailored group of geographical locations may include geographical locations in different countries. The system may further comprise browser extensions distributed over the multiple virtual private servers. In exemplary embodiments, the product or service is a travel service such as a flight.

In exemplary embodiments, the search engine is provided via a front-end mobile application supporting both iOS and Android platforms. A user interface displays a list of search results including the product or service. Exemplary embodiments include a sticker icon, and a user can drag the sticker icon over any search result to request price information for the product or service shown in the search result. When a user clicks on the sticker icon, the system directs the user to a pop-up showing the price information for the product or service and/or provides a link to a website providing the lowest price for the product or service. When a user clicks on the sticker icon, the system automatically saves the price information for the product or service in a dedicated savings page.

Exemplary embodiments include methods of price comparison and optimization comprising linking multiple virtual private servers in a tailored group of geographical locations, searching across the multiple virtual private servers, tracking and comparing prices of a product or service in the tailored group of geographical locations, and providing the lowest price for the product or service in the tailored group geographical locations to a user in any geographical location. In exemplary embodiments, the product or service is a flight. Any product or service could be searched through exemplary systems, including travel services such hotels, car rentals, excursions, etc. as well as clothing, electronics, furniture, appliances, toys, media, entertainment, sports, etc. The tailored group of geographical locations may include geographical locations in different countries. Disclosed methods may be provided to the user via a mobile application supporting both iOS and Android platforms.

In exemplary methods, the searching is done among online travel agents and/or online travel aggregators and providing the lowest price includes selecting an online travel agent or online travel aggregator. The user may insert flight details at the selected online travel agent or online travel aggregator and browse flights. Exemplary methods further comprise displaying a list of search results including the product or service.

Exemplary methods include providing a sticker icon. The user can drag the sticker icon over any search result to request price information for the product or service shown in the search result. Exemplary methods further comprise directing a user to a pop-up showing the price information for the product or service and providing a link to a website providing the lowest price for the product or service when the user clicks on the sticker icon.

Accordingly, it is seen that systems and methods of enabling dynamic, worldwide searching, price comparison, and price optimization are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
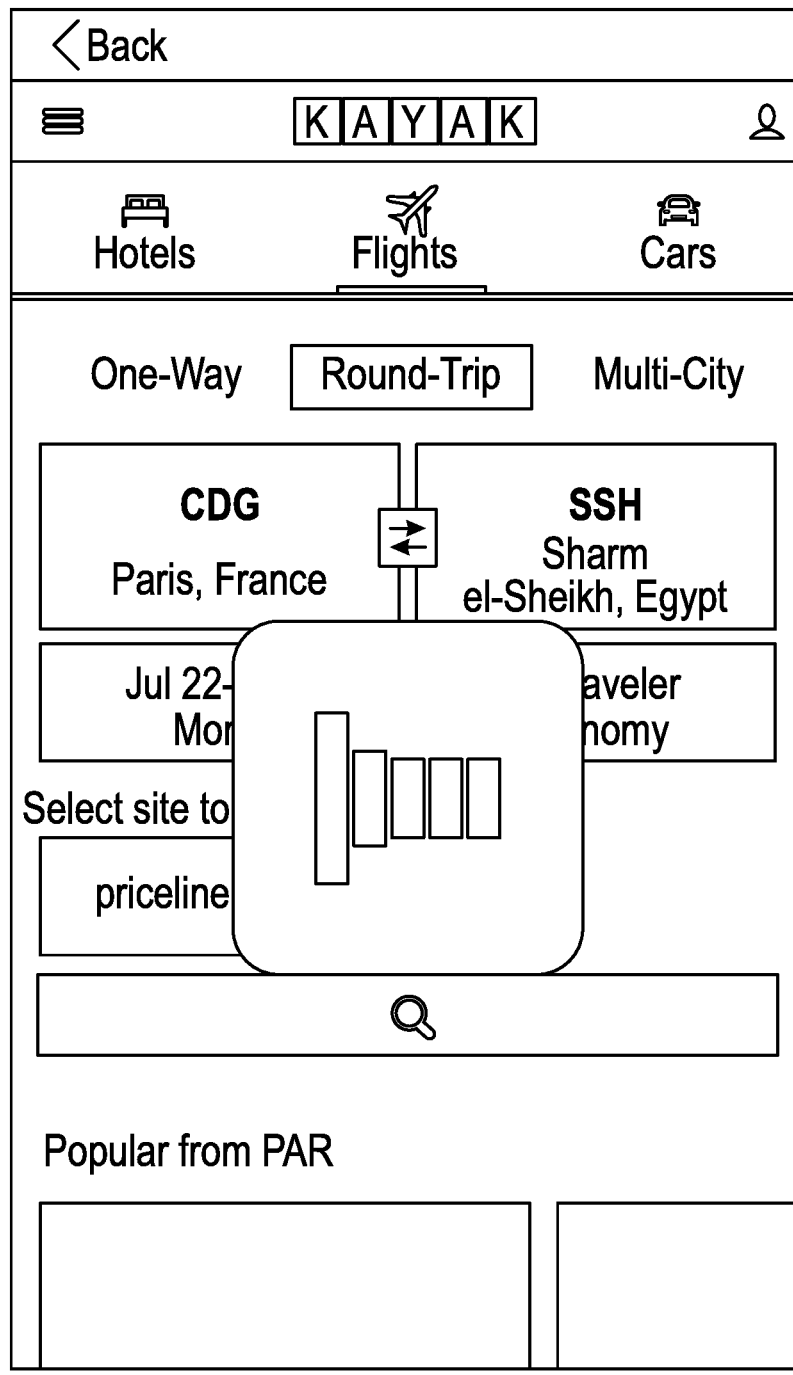
FIG. 1 is a perspective view of an exemplary embodiment of a dynamic search engine in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate within a wide variety of such parameters. It should be noted that the figures do not show every piece of equipment, nor the materials, configurations, and directions of the various circuits and communications systems.

With reference to FIGS. 1-2 and 7-13, exemplary embodiments of a system 10 of dynamic searching will be described. System 10 has a search engine 12 supported by a back-end architecture 14 and may be provided to users online on any personal computing device and/or via a front-end mobile application 100. The search engine 12 operates through many browser extensions 16 distributed over a number of virtual private servers 18 on the cloud. In exemplary embodiments, the system 10 might include 50-100 Chrome or other browser extensions and 10-25 private servers, but these numbers could vary considerably based on the number of users, searches, and other factors.

The browser extensions 16 and caching servers 18 act as the players that handle the users' search requests. In exemplary embodiments, they take on the form of several countries or locations through dynamic IP and link manipulation to server up to nine different locations per user request and find the best possible price for a given product or service. The up to nine different locations form a tailored group 19 of geographical locations 17. That is, they are selected based on a custom algorithm tailored towards finding the best possible price for a given product or service for users, no matter where in the world the users themselves are located.

Figure 2:
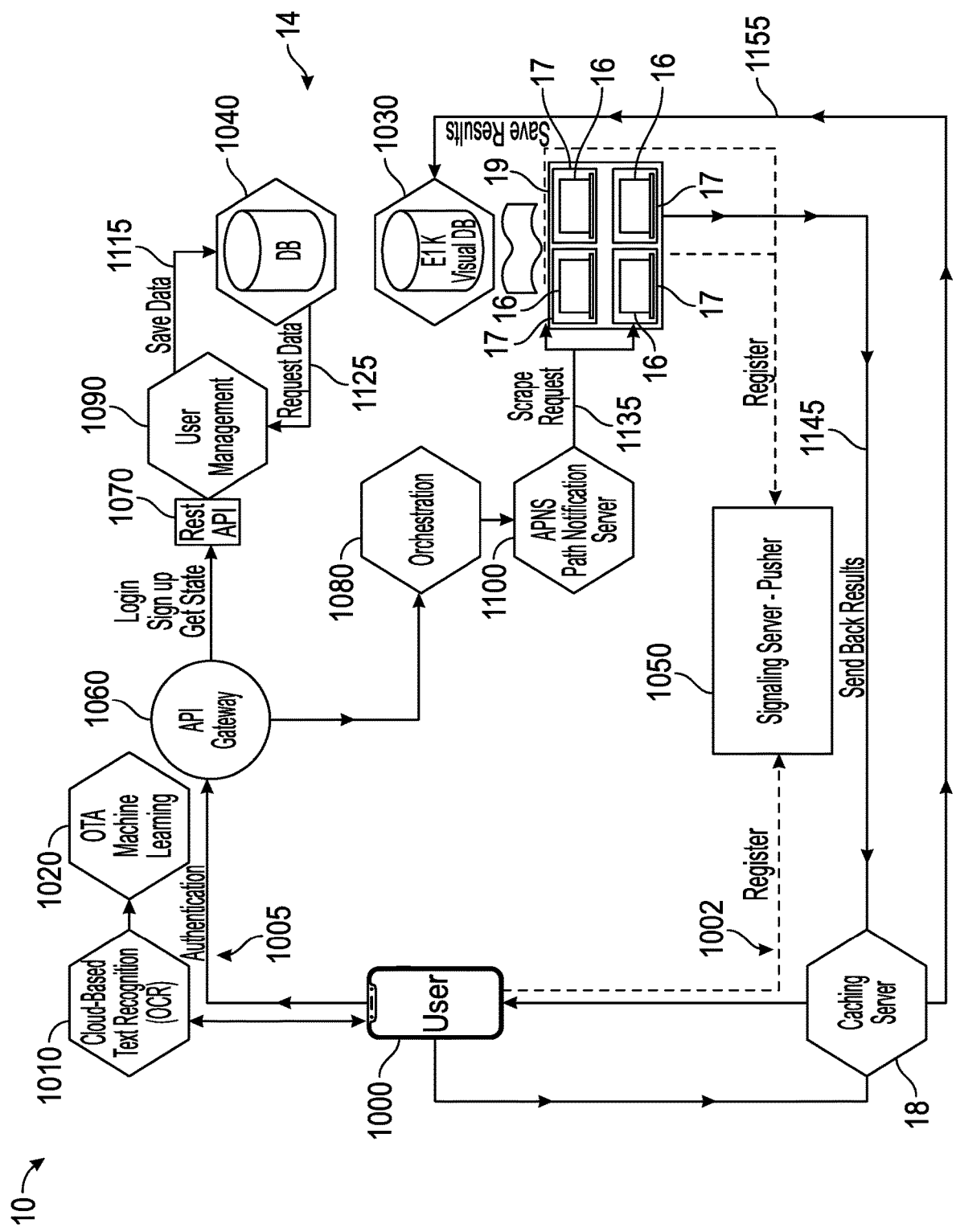
FIG. 2 is a schematic diagram of an exemplary embodiment of a system and method of dynamic searching, price comparison, and optimization including exemplary back-end architecture in accordance with the present disclosure.

As best seen in FIG. 2, back-end architecture 14 comprises a complex series of custom components, services, databases, tracking tools, and third-party integrations, some of which are on the user device and some of which are on the cloud. These include cloud-based text recognition 1010 for on-device optical character recognition (OCR) text detection for Latin-based characters, online travel agent (OTA) and aggregator machine learning 1020, as well as a caching server 18. A library allows capture of screenshots from mobile device WebView. Fully custom developed code and scripts for various features such as the drag and save sticker and DOM Manipulation and listeners scripts are described in more detail herein.

In exemplary embodiments, cloud-based components and features of the back-end architecture 14 include one or more of the following. An open source cloud-based technology for more complex and in-depth OCR text recognition may be used to identify different fonts and styles. The OCR technology is adapted and updated to run on flight data and interpret results in text form. Customized logic rules using coordinates and text positioning applied on the recognized text filter the information and match it with corresponding flight data. The OCR technology may be utilized to crack the logic of the OTAs, which the system may organize into groups and subgroups. In addition, a stronger and more general logic applies OCR and matches data in a more general way that is not OTA-specific or OTA-group specific. It may also be able to learn and adapt to new OTAs as users visit them, as opposed to a pre-defined list. Exemplary embodiments can match interrupted OCR results with prior user data to match flights and find lower prices.

A high-performance streaming platform connects the browser extensions 16 and databases, and an orchestration tool 1080 orchestrates and messages between browser extensions. There may be technology configured and used to store models for each OTA and aggregator to save the structure of each product or service item searched and selected by the user. This could also be used for temporary storage of product or service items for users doing searches. An elastic cloud platform may be used for data warehousing and visualizations. A cloud platform and digital ocean is used for data storage and hosting all components. There is also technology for storing live data of the OTA configurations for instant changes and modifications required, without forcing application updates. User tracking and bug reporting capabilities are also provided.

Turning to FIGS. 3-13B, exemplary embodiments of a mobile application 100 providing dynamic searching, price comparison, and price optimization will now be described. The mobile application includes an optional sign-up process 102 so a user can create his or her unique profile 106 and a sign-in 104 to access the mobile app. The mobile app may collect information about the user, including but not limited to, name, email address, date of birth, gender, profile picture, hashed and encrypted passwords, geolocation, device name and type, and operating system name and version. In exemplary embodiments, an active database holds all active users' personal data. Deleted or deactivated user info is deleted immediately from the active database upon a user's decision to delete or remove their account. A retention archive may keep records for deleted users for a set period of time. A popup may appear during a new user's first visit to the mobile application. This would provide options to approve or reject certain non-vital tracking tools.

Figure 6:
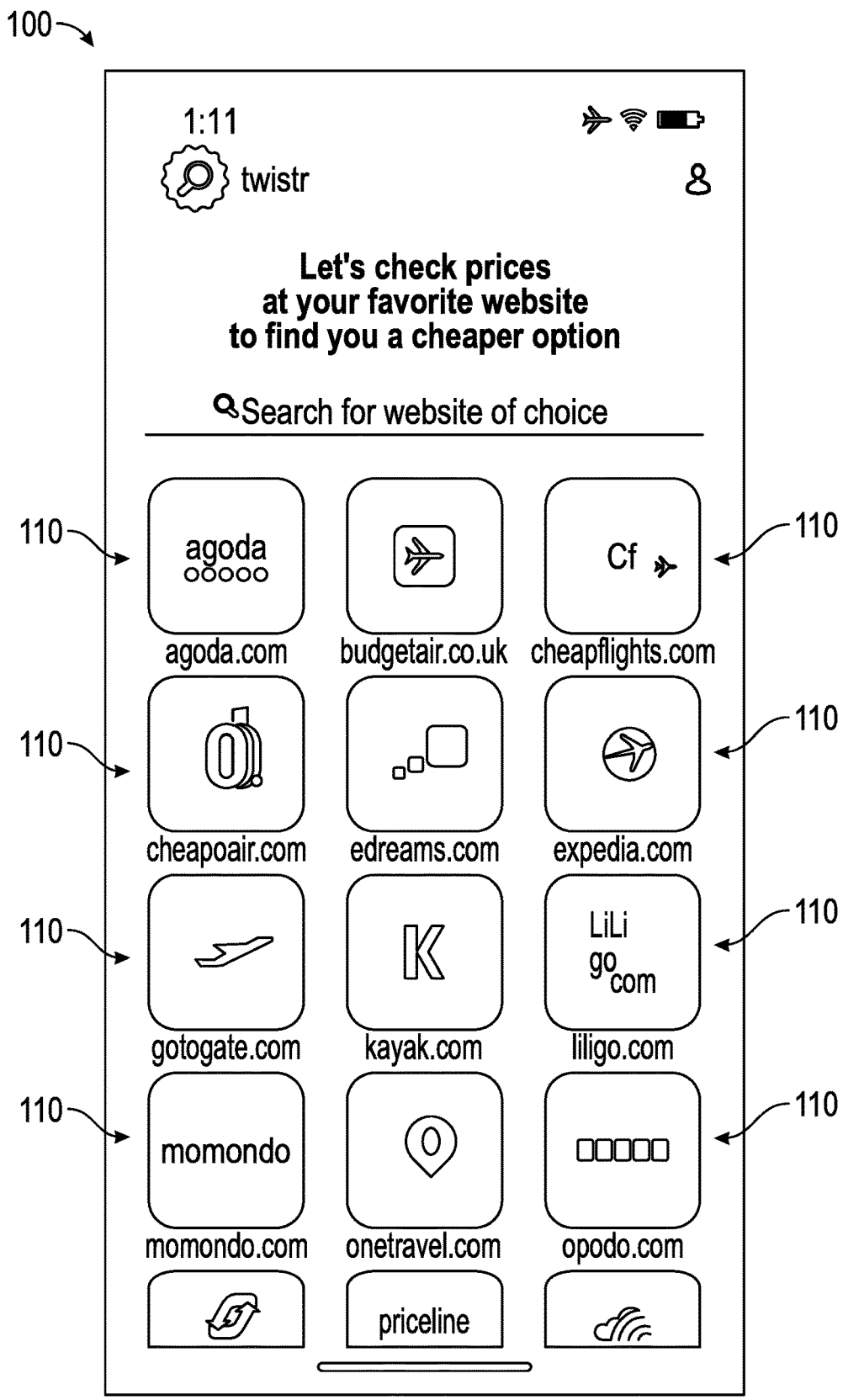
FIG. 6 is a perspective view of an exemplary embodiment of a system and method of dynamic searching, price comparison, and optimization showing a mobile application page for selecting an OTA/aggregator.
Figure 7:
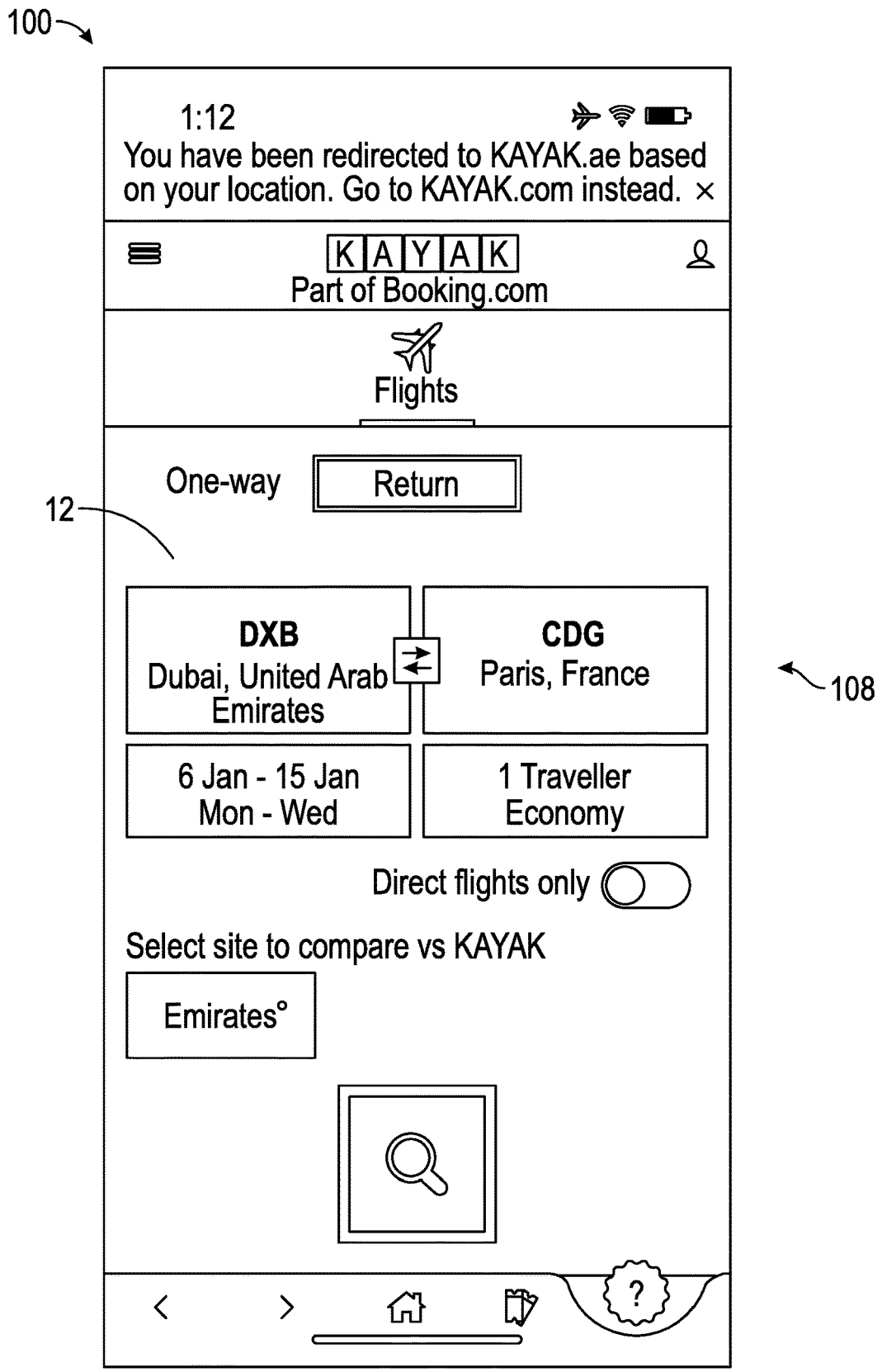
FIG. 7 is a perspective view of an exemplary embodiment of a system and method of dynamic searching, price comparison, and optimization showing a mobile application flight itinerary search page.
Figure 8:
FIG. 8 is a perspective view of an exemplary embodiment of a system and method of dynamic searching, price comparison, and optimization showing a mobile application flight search results page.

The core functionality and heart of the user experience is the search process for the best price on any product or service. In exemplary embodiments, the search process is configured for the user to find airline tickets. As best seen in FIGS. 6 and 7, there are one or more pages for inserting a flight itinerary 108 as well as pages for selecting an OTA/aggregator 110 such as Priceline, Orbitz or Kayak. Then the mobile app loads the interface of the selected aggregator with the results set 112 displayed, as shown in FIG. 8.

Referring to FIGS. 9A-9C and 10A-10B, the mobile app includes a "Drag and Save" sticker icon 114 which can be dragged over any desired flight and query the back-end architecture for potential savings and a cheaper option. Clicking the sticker icon 114 directs the user to the flight details pop-up 116 and re-direction link 118 to the unique cheaper offer's website to book the flight. Alternatively, the user could hit an icon to select between drawing a shape such as a rectangle or a circle on a desired flight. The gesture made by the user may be taken as a screenshot and OCR with logical matching is applied in real time to recognize and match the text with flight details. All flights marked by the drag and save sticker icon 114 are automatically saved 1155 in a dedicated savings page. Any saved data may be maintained indefinitely in a History database separate from the user personal information database. In exemplary embodiments, when a user deletes the app any reference to the History database for that user is deleted but the information may be maintained as user-less or anonymous information.

Exemplary embodiments of the mobile app may utilize various solutions to optimize searching and tracking capability, user experience, maintenance, and support. In addition to user movements such as clicking and dragging, rectangular or circular movements or drawings can be used. The system may use a technology that allows the drawing of perfect or imperfect rectangles or circles to recognize patterns and screenshot the relevant sections accordingly. Other gestures could be used as well. The system may incorporate a technology called Pusher 1050, which helps improve orchestration of the browser extensions 16 on the cloud and advances monitoring and upkeep operations for the extensions. In exemplary embodiments, the system employs automated monitoring of extensions and their status and general activity. A push notification server 1100 communicates with the browser extensions 16, including signaling the browser extensions to scrape requests 1135 if necessary. A Kafka cluster enterprise level solution with several scalability options swiftly funnels scraped results to the system's databases. This helps the system collect data more efficiently as user demand increases. The system extension can be integrated with Google search results.

The Main Flights Database may be located in a Shared MongoDB Cluster 1040 to provide higher availability during writes operations. Machine learning allows input of flight screens to enhance data capture optimization. The Data Warehouse ELK stack 1030 may be integrated via ELK Cloud for more optimized cost-effective storage. A user management module 1090 communicates with the MongoDB to save 1115 user search data and request 1125 data. Translation logic may be used for translating re-direction links, and additional terms are handled in a custom database that improves certain related keywords over time. A fingerprinting technology may be utilized to spot errors and bugs in the mobile app. Automated testing on OTAs detects changes and issues early for quick fixes. Certain analytics technologies can be used to collect data on the use of the mobile app and monitor performance, number of installations and removals of the app, and build version distributions. Authentication technologies may also be used to authenticate 1005 the user when he or she connects to the mobile application.

A Scraper API 1070 may be developed and integrated on the browser extensions to bypass captcha automatically on the cloud Chrome extensions. This advantageously increases the results set produced by the browser extensions, minimizes the need for manual intervention, and allows fewer extensions to support more user requests. In addition, the configurations for the supported OTAs may be fortified so they are less error prone. Exemplary embodiments provide support for searching premium and first-class flights as well as for seat and lap infant accommodations. Fortifications are provided to prevent unexpected errors or crashes, and any such events are automatically reported to the app's development team.

In exemplary embodiments, the system employs technology to inject custom-built code on the webview or user front-end to "listen" to certain actions on the front end of website and, based on those actions, make certain decisions in the back-end architecture 14. An example of such technology is Listeners and DOM Manipulation, which is new to mobile applications. Disclosed systems use this type of technology for several purposes. It is used to detect currency exchange on the OTA. Once detected, the system runs a conversion tool on the back end so the mobile app displays the correct currency to the user when matching flights with OTA prices. It is also used to detect any user change on the OTA such as dates or changes to the entire flight. In the latter case, an entirely new search may be quickly launched in the background on the system's servers so the results are updated to match the latest flight choices on the OTA. In exemplary embodiments, the sticker icon 114 feature utilizes DOM Manipulation to position correctly as an invisible layer on top of the OTA. In addition, this technology may be used to follow the UX journey of the user thought-out the OTA and load the right script and configuration when needed.

This technology confers several advantages on disclosed systems and methods. It is very difficult, and perhaps impossible, for the OTA to detect because it is situated completely and only on the front-end of the system and does not launch any activity or requests to the OTA. This technology makes cracking OTAs' layouts, drag tool usage, sticker icon positioning, background highlighting, and changes less OTA-specific and allows more of a general implementation with unique case-by-case configurations. In addition, server configuration files can be used to control the OTAs and their specific configurations relating to the features utilizing Listening and DOM Manipulations. This means that adding and removing OTAs and updating OTA cracking logic can be done from the server in most cases and does not require an update to the mobile app.

Although initial loading of the listening technology (and back-end data) needs some time and listeners are connection speed specific for the user since they run on the foreground, this can be alleviated by implementing dynamic loaders ranging from a couple of seconds to several seconds (depending on connection speeds of the user) to make sure everything is loaded and ready before giving control to the user or their selected OTAs. OTA specific configurations may be required that are sensitive to OTA design and back-end logic changes, but implementation of server-side configuration and management of the scripts can handle this issue.

Figure 14:
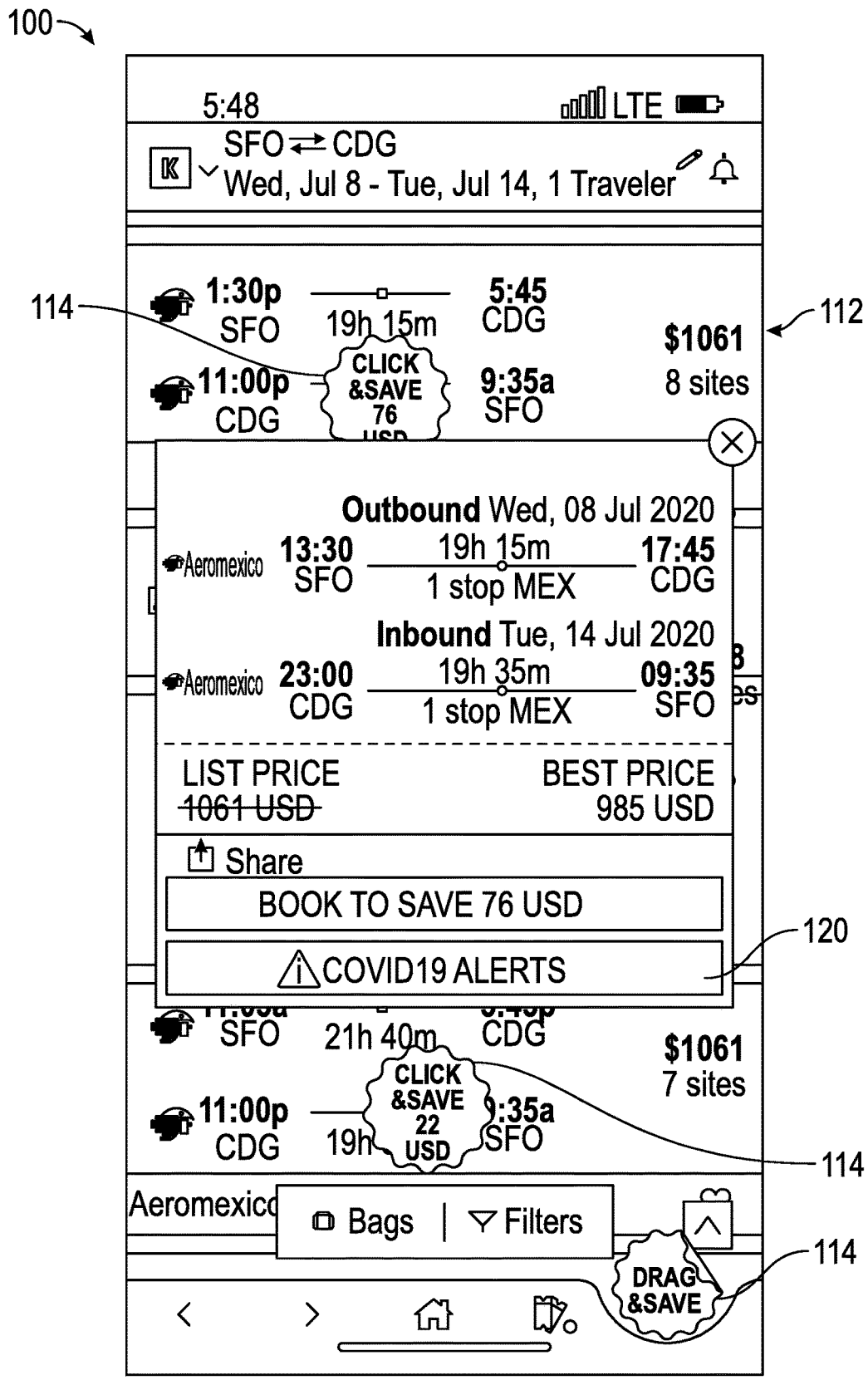
FIG. 14 is a perspective view of an exemplary embodiment of a system and method of dynamic searching, price comparison, and optimization showing a mobile application COVID-19 alert button.
Figure 15:
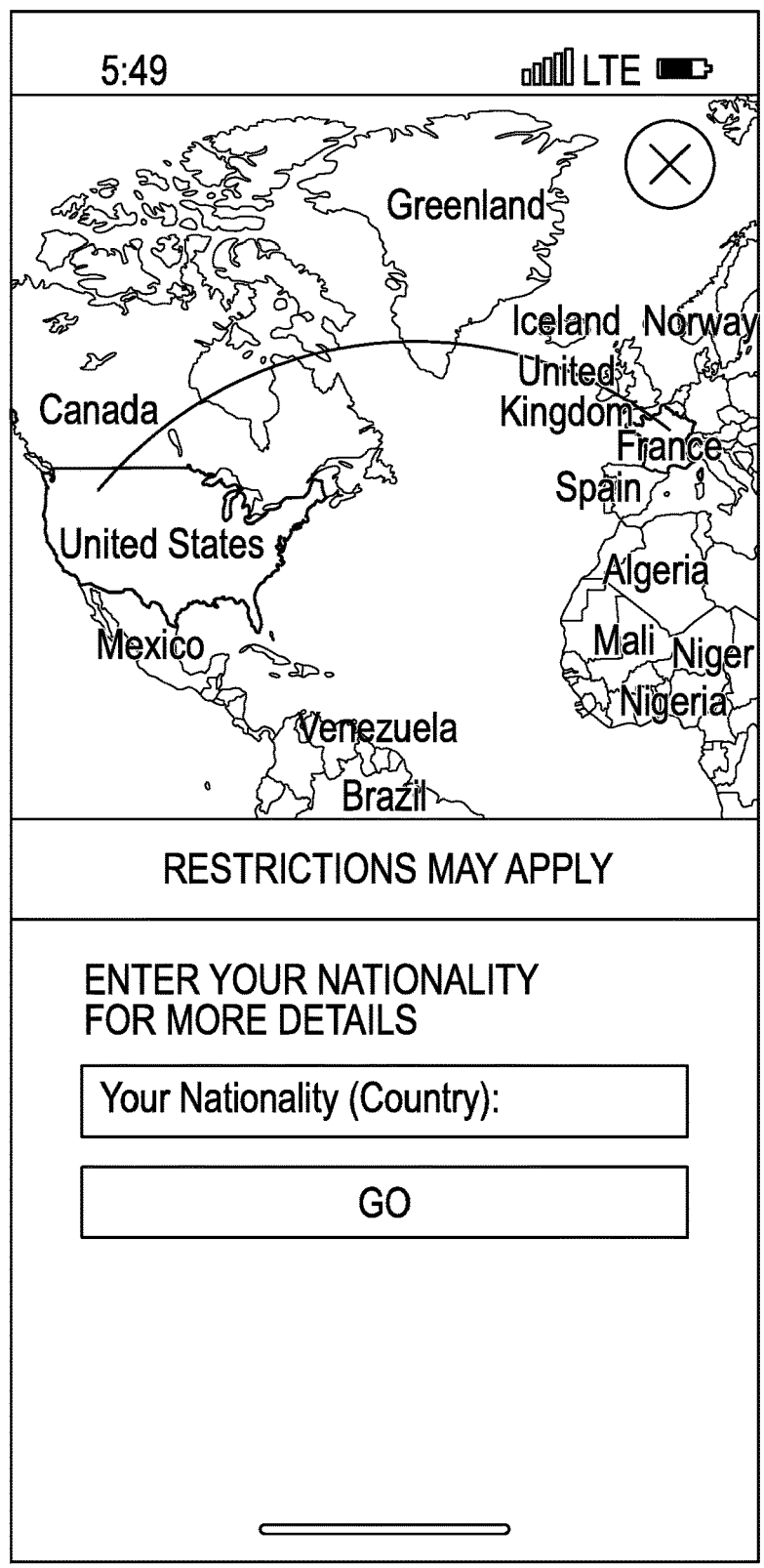
FIG. 15 is a perspective view of an exemplary embodiment of a system and method of dynamic searching, price comparison, and optimization showing a mobile application COVID-19 information page.
Figure 16:
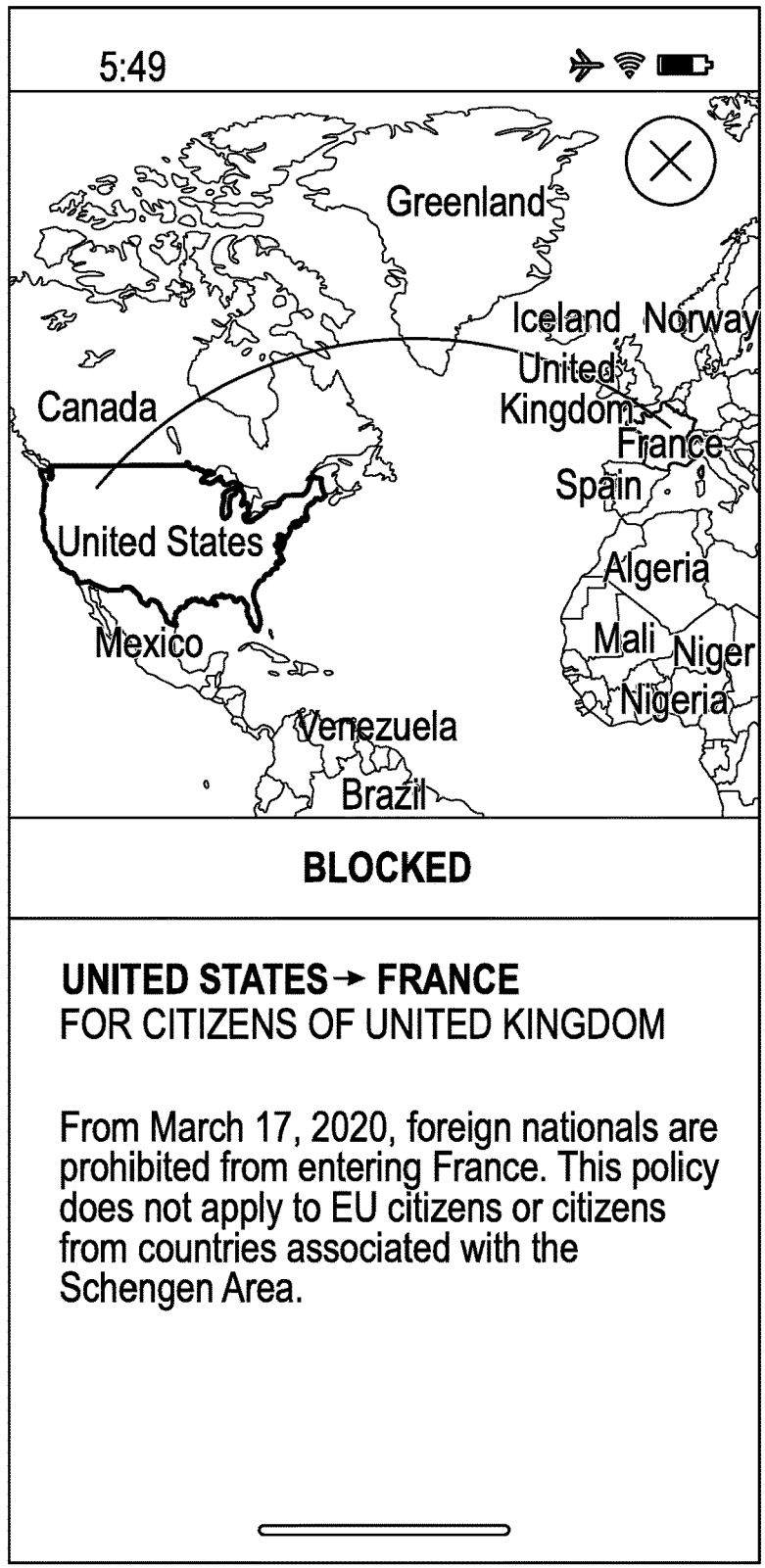
FIG. 16 is a perspective view of an exemplary embodiment of a system and method of dynamic searching, price comparison, and optimization showing a mobile application COVID-19 information page.

As illustrated in FIGS. 14-16, exemplary embodiments provide COVID-19 information. In addition to the existing book and share buttons, a price details/sticker popup may include a COVID-19 warning button 120. In exemplary embodiments, a COVID-19 page 122 is provided that includes a map of the flight, nationality selection, travel status, and detailed text about rules and warnings related to the virus. The map is fully integrated with the mobile app and can be used for other purposes in addition to COVID-19 information. The database for all data is maintained on the system's server and feeds both the app and the COVID-19 pages.

Figure 3:
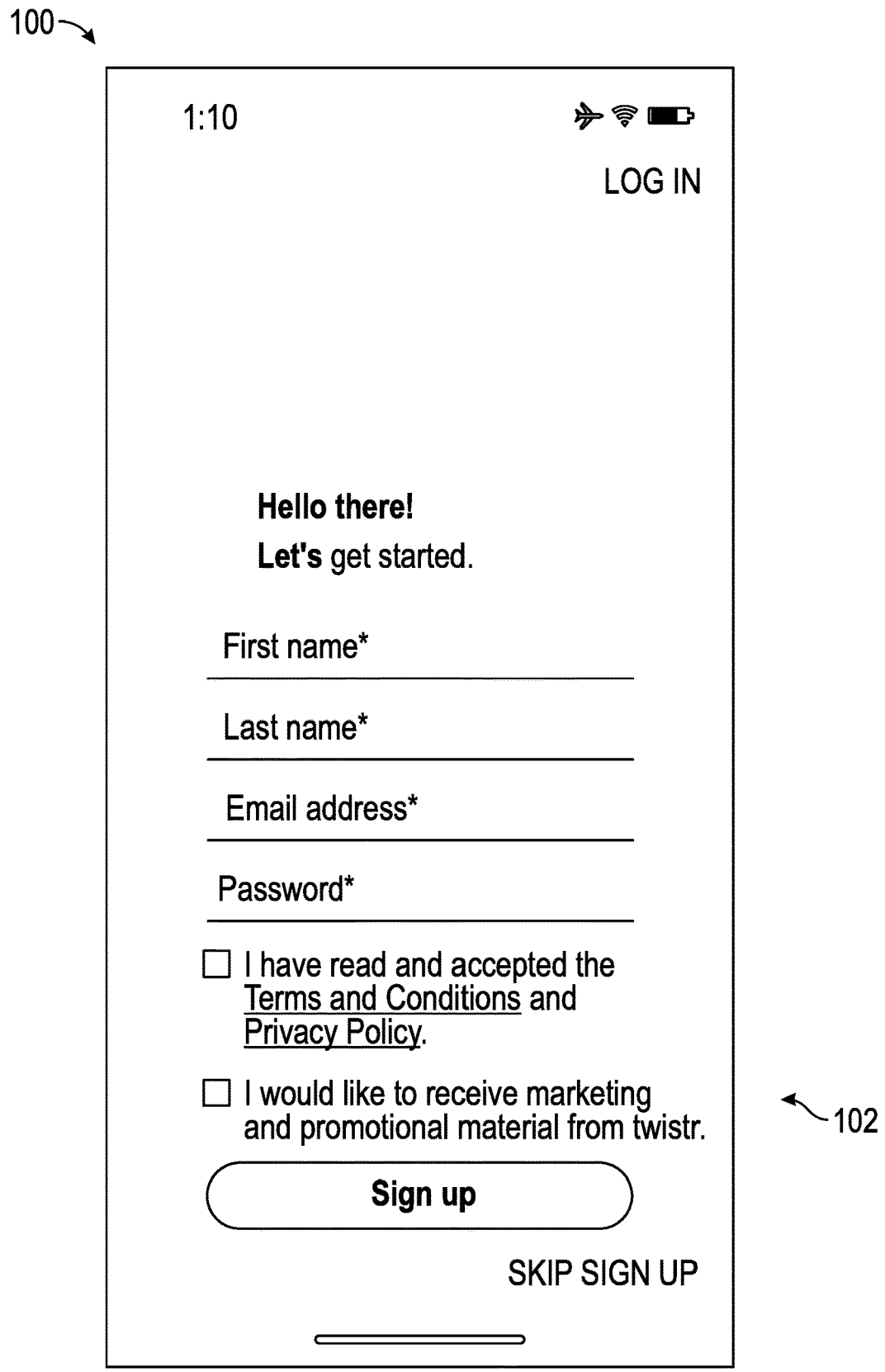
FIG. 3 is a perspective view of an exemplary embodiment of a mobile application showing a sign-up page in accordance with the present disclosure.
Figure 4:
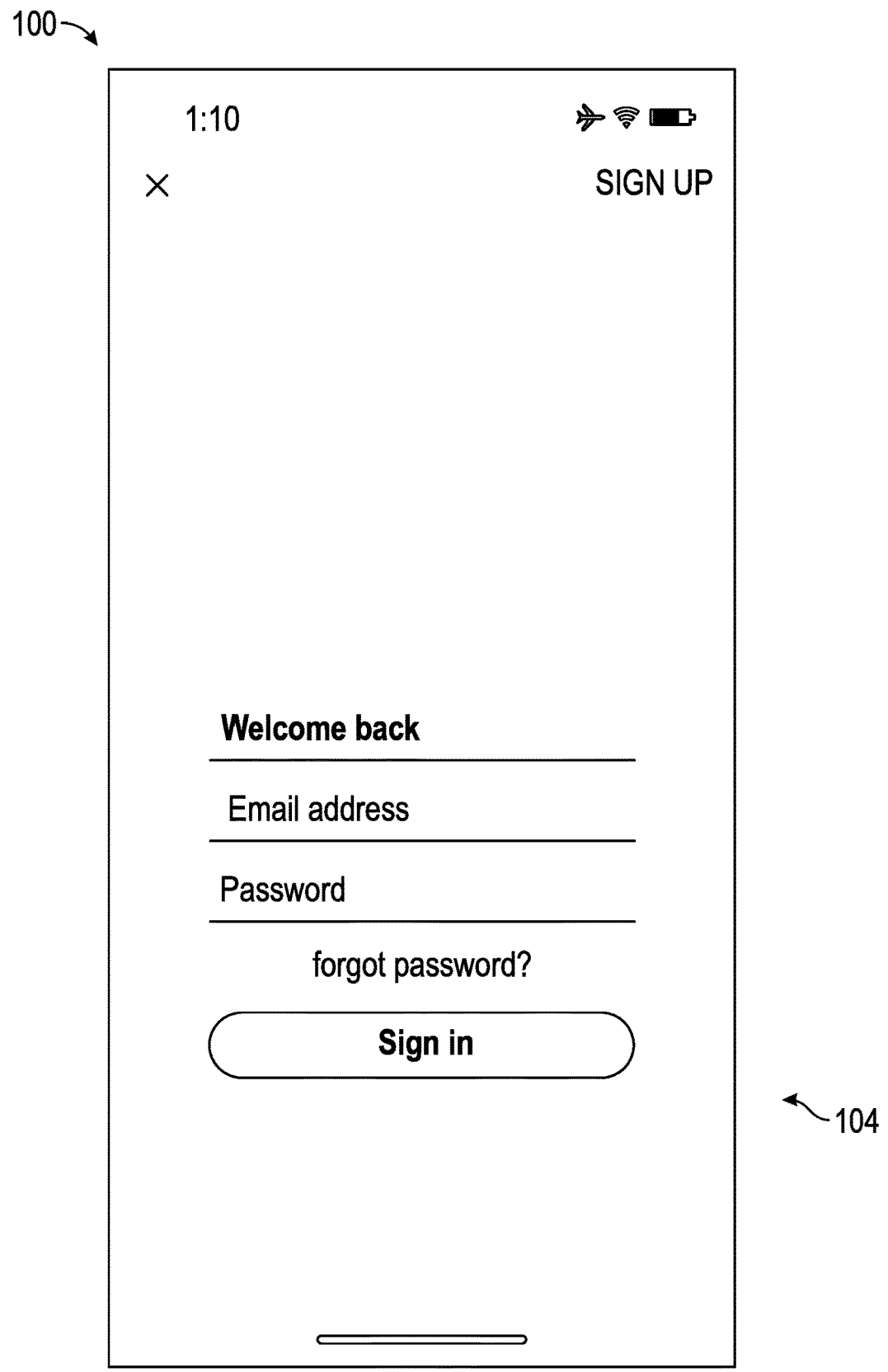
FIG. 4 is a perspective view of an exemplary embodiment of a mobile application showing a sign-in page in accordance with the present disclosure.
Figure 5A:
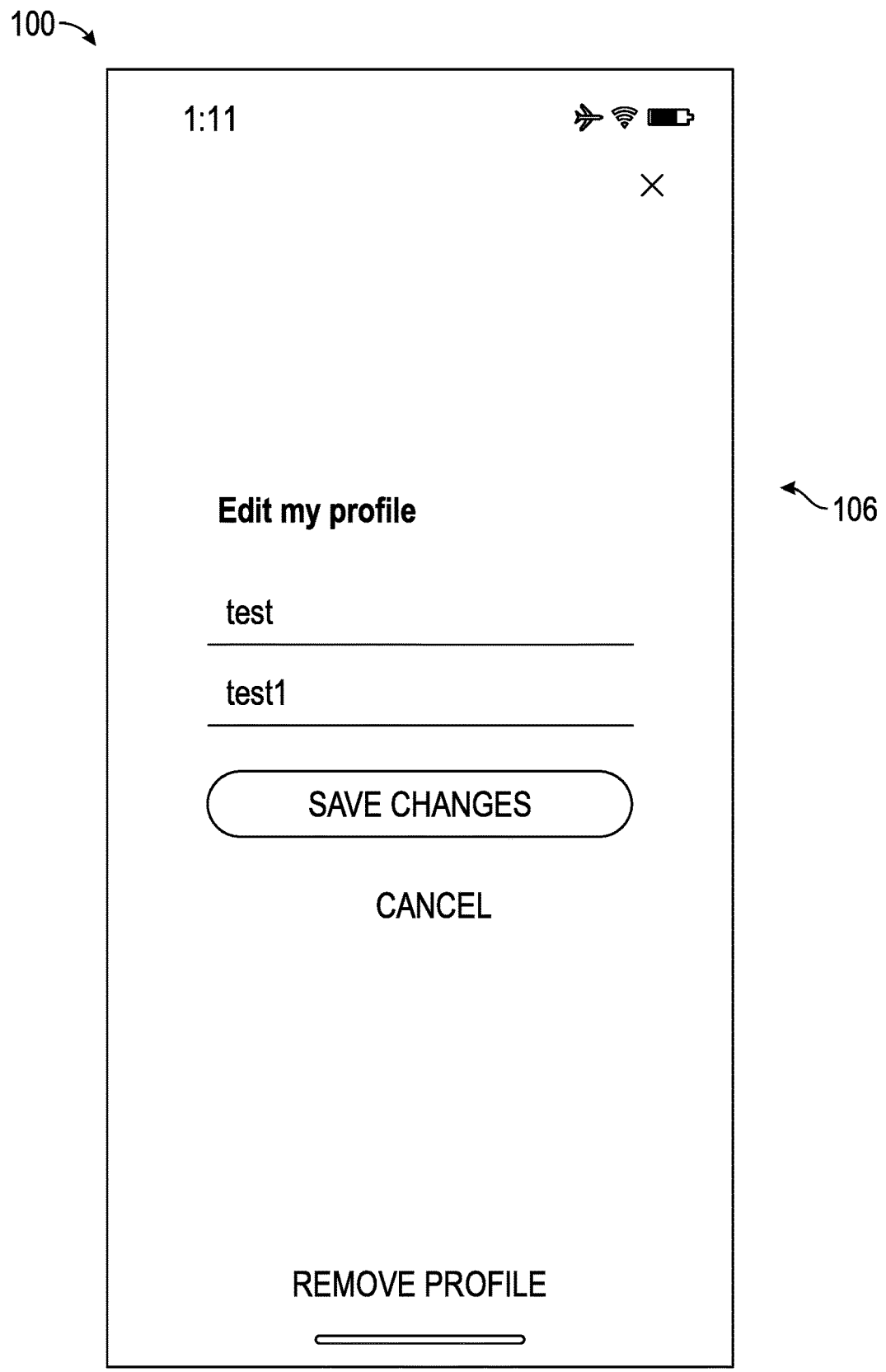
FIG. 5A is a perspective view of an exemplary embodiment of a mobile application showing a profile page in accordance with the present disclosure.
Figure 5B:
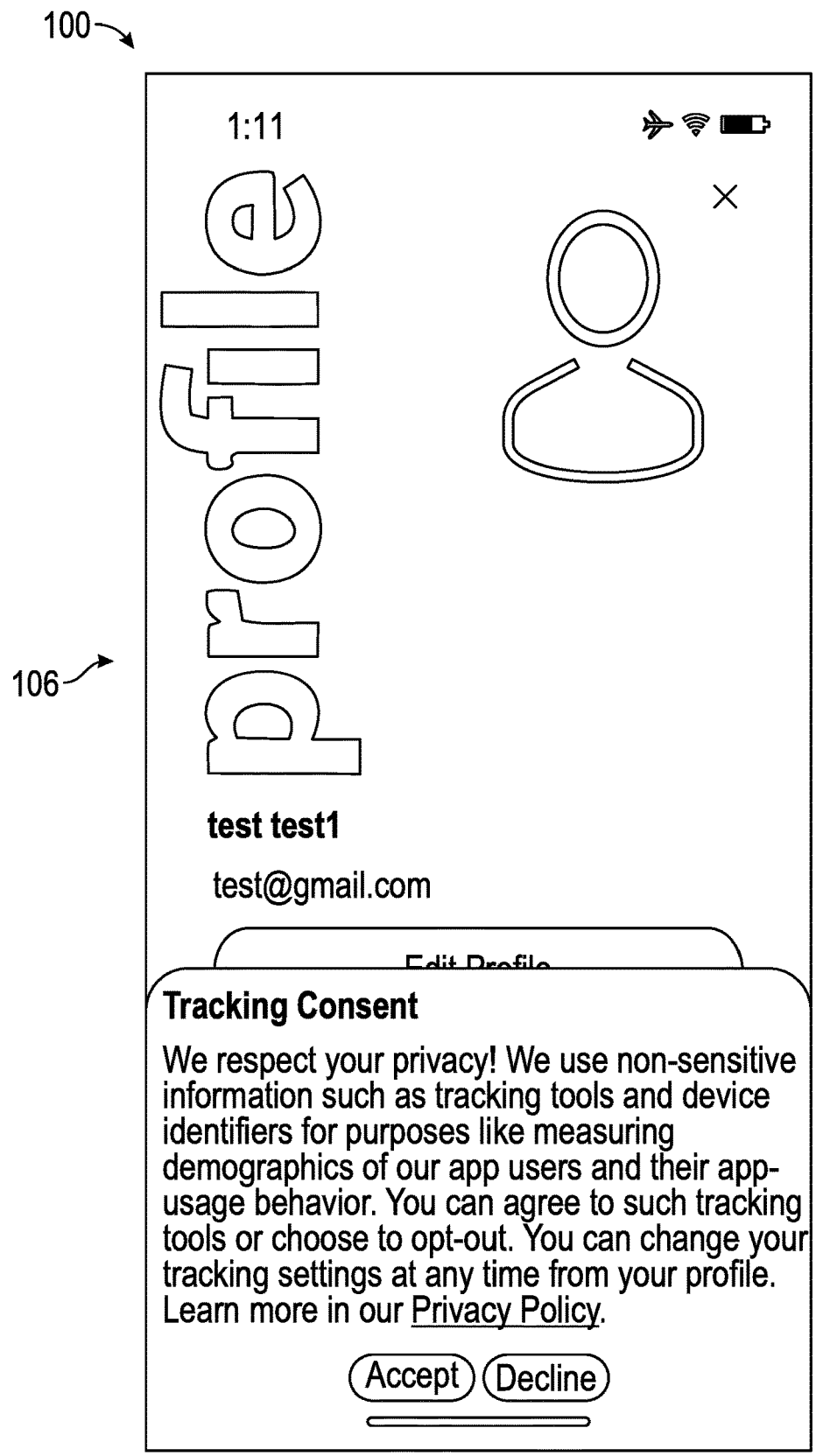
FIG. 5B is a perspective view of an exemplary embodiment of a mobile application showing a profile page in accordance with the present disclosure.

In operation, the user downloads the app onto his or her mobile device 1000 and registers 1002 by providing basic information such as first and last name and email address and creating a password, as shown in FIG. 3. After the initial sign-up, the user signs in by typing the email address and password (FIG. 4). The user's credentials are authenticated (Step 1005) and sent through API Gateway 1060 to the Scraper API 1070. As best seen in FIGS. 5A-5B, the user is then prompted to create their own unique profile, which is optional. In exemplary embodiments, a popup directs users using unsupported languages to change to one of the supported ones, which may include English, French, German, Dutch, Spanish, Italian, and Portuguese. To search for a flight on the mobile app, the user selects from a list of OTAs or aggregators 110, illustrated in FIG. 6, and then visits their websites. Alternatively, the user may be prompted to insert the desired flight details on a custom page of the app and is then redirected to a page to select an OTA or aggregator 110. An initial page of the app may display the user's recent searches and allow the user to select one of them.

Once the user inputs the desired flight details and chooses an OTA or aggregator 110, the app loads the interface of the selected OTA or aggregator, and the results 112 are displayed (FIGS. 7-8). The user can then browse the offered flights. It should be noted that inserting flight itinerary on the app is sufficient to get a full set of results from the OTAs without the need to re-enter flight details. Alternatively, the app might collect the flight itinerary based on the information the user inserts into the OTA. In exemplary embodiments, the app ranks OTAs based on their pricing and which locations provide the best prices.

Figure 9A:
FIG. 9A is a perspective view of an exemplary embodiment of a system and method of dynamic searching, price comparison, and optimization showing a mobile application flight itinerary search page with an exemplary drag and save sticker icon.
Figure 9B:
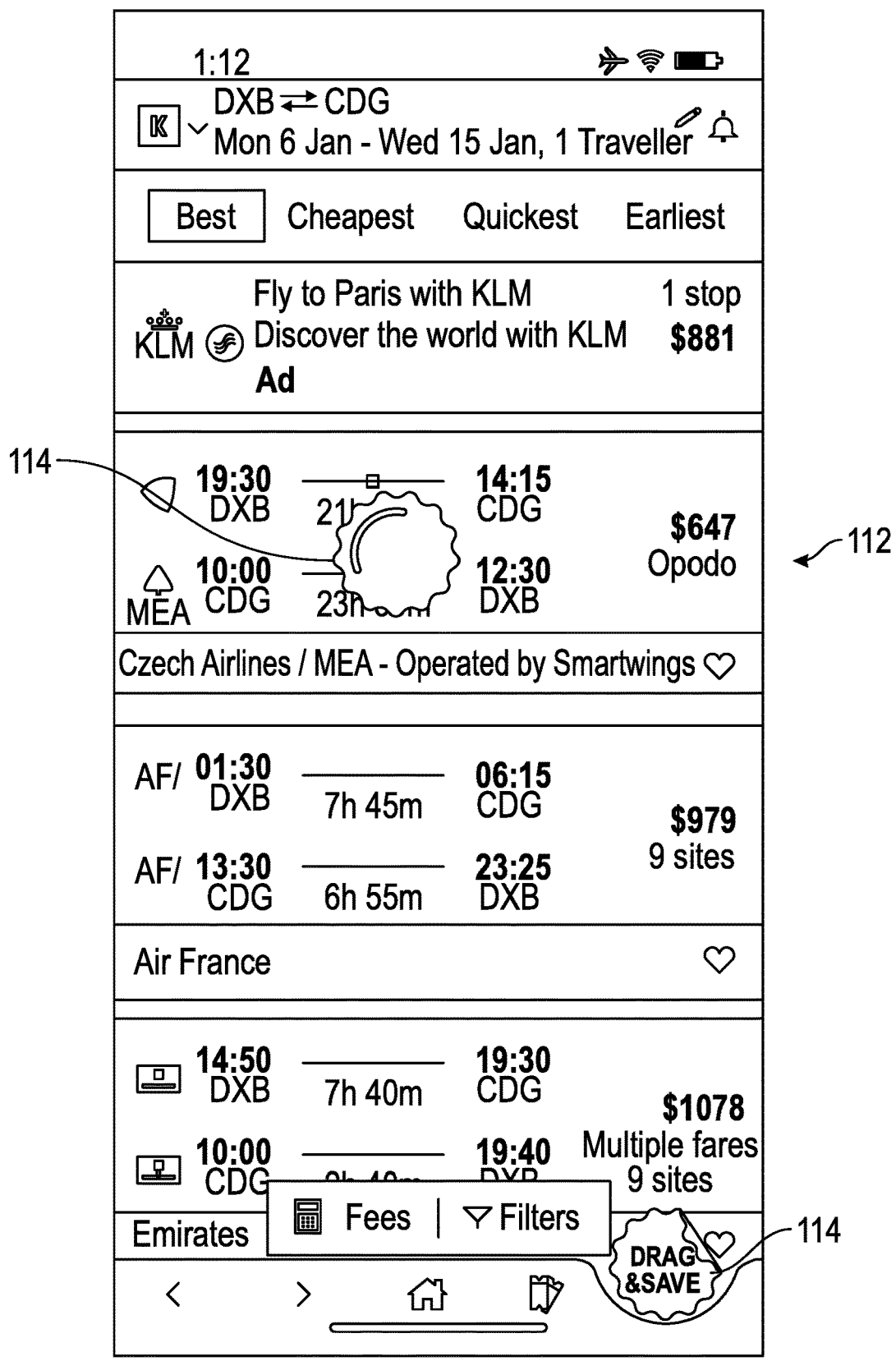
FIG. 9B is a perspective view of an exemplary embodiment of a system and method of dynamic searching, price comparison, and optimization showing a mobile application flight itinerary search page with an exemplary drag and save sticker icon.

As shown in FIGS. 9A-9B, to select a flight option, the user drags the "Drag and Save" sticker icon 114 over the desired flight. This action queries the system's back-end architecture 14 for potential savings and a cheaper option. At this time, the system's server submits a predictive search query to a group of virtual private servers accessed on chosen member devices around the world. This group is selected based on the members having the best online profiles and locations. Through the browser extensions 16, the back-end architecture 14 runs queries on OTAs or aggregators through the chosen member devices distributed across several countries or locations to find the best possible price for the user's flight and sends 1145 the results back to the user's device 1000 via the caching server 18.

Figure 9C:
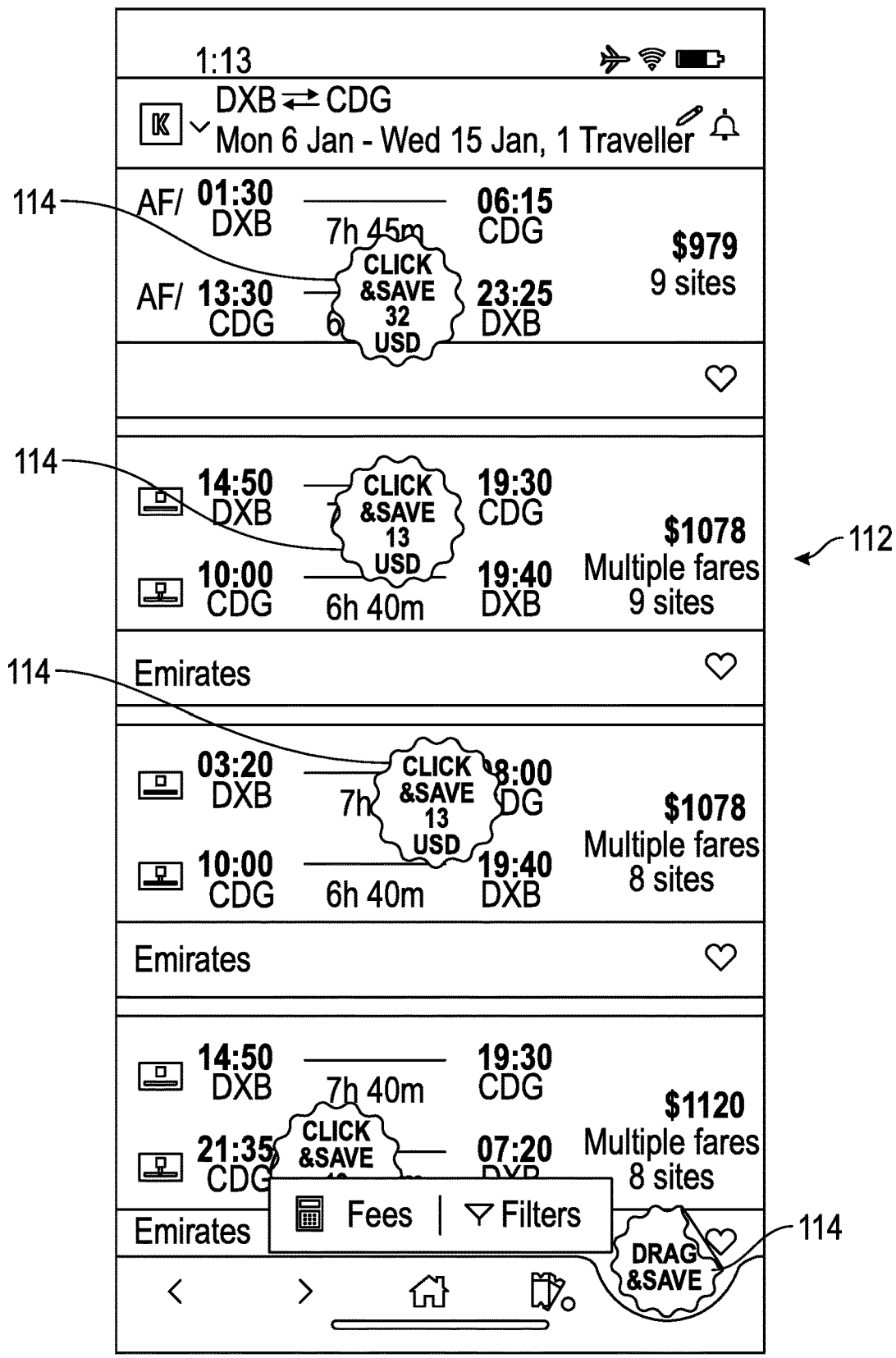
FIG. 9C is a perspective view of an exemplary embodiment of a system and method of dynamic searching, price comparison, and optimization showing a mobile application flight itinerary search page with an exemplary drag and save sticker icon.
Figure 10A:
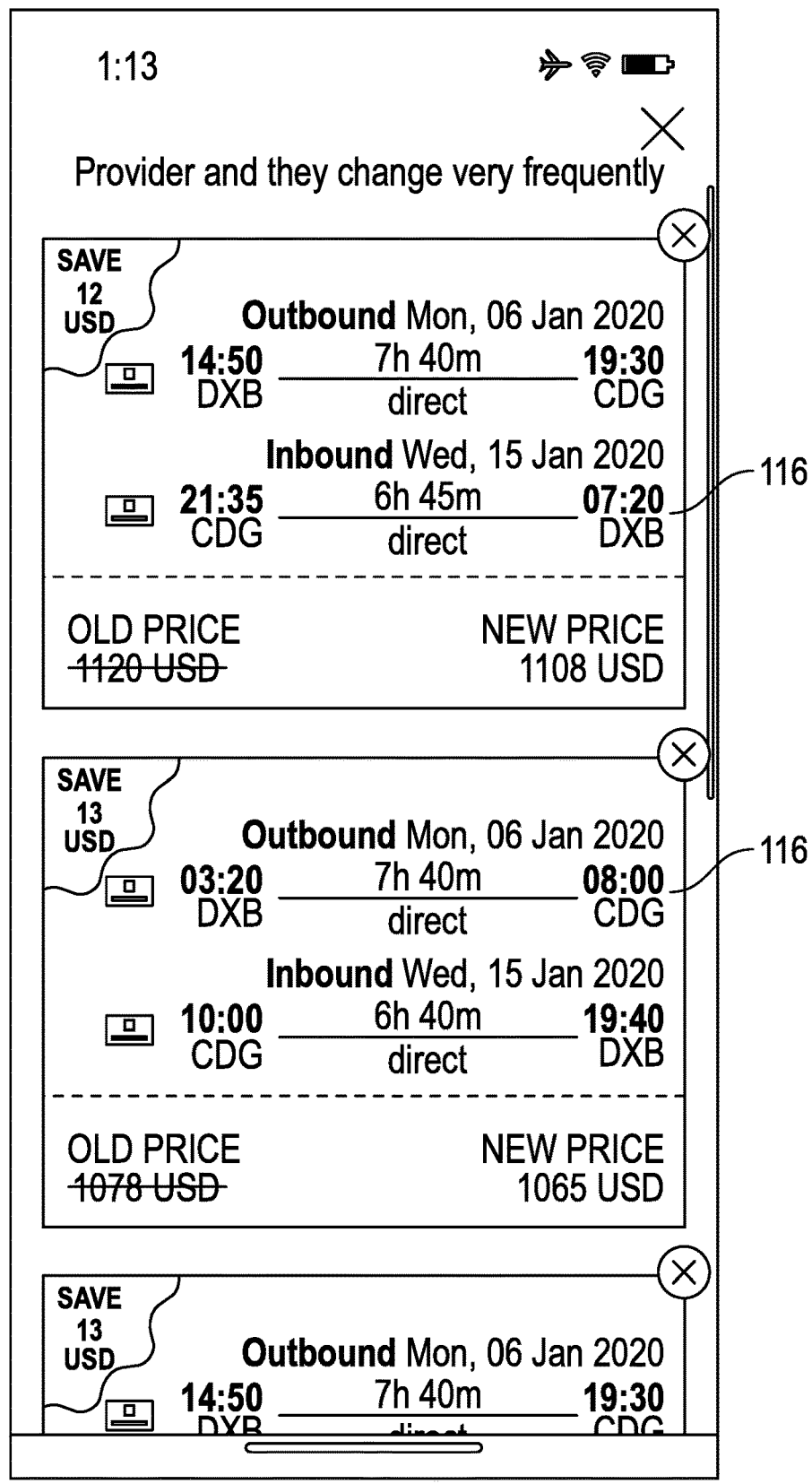
FIG. 10A is a perspective view of an exemplary embodiment of a system and method of dynamic searching, price comparison, and optimization showing a mobile application flight itinerary search page with an exemplary flight details popup.
Figure 10B:
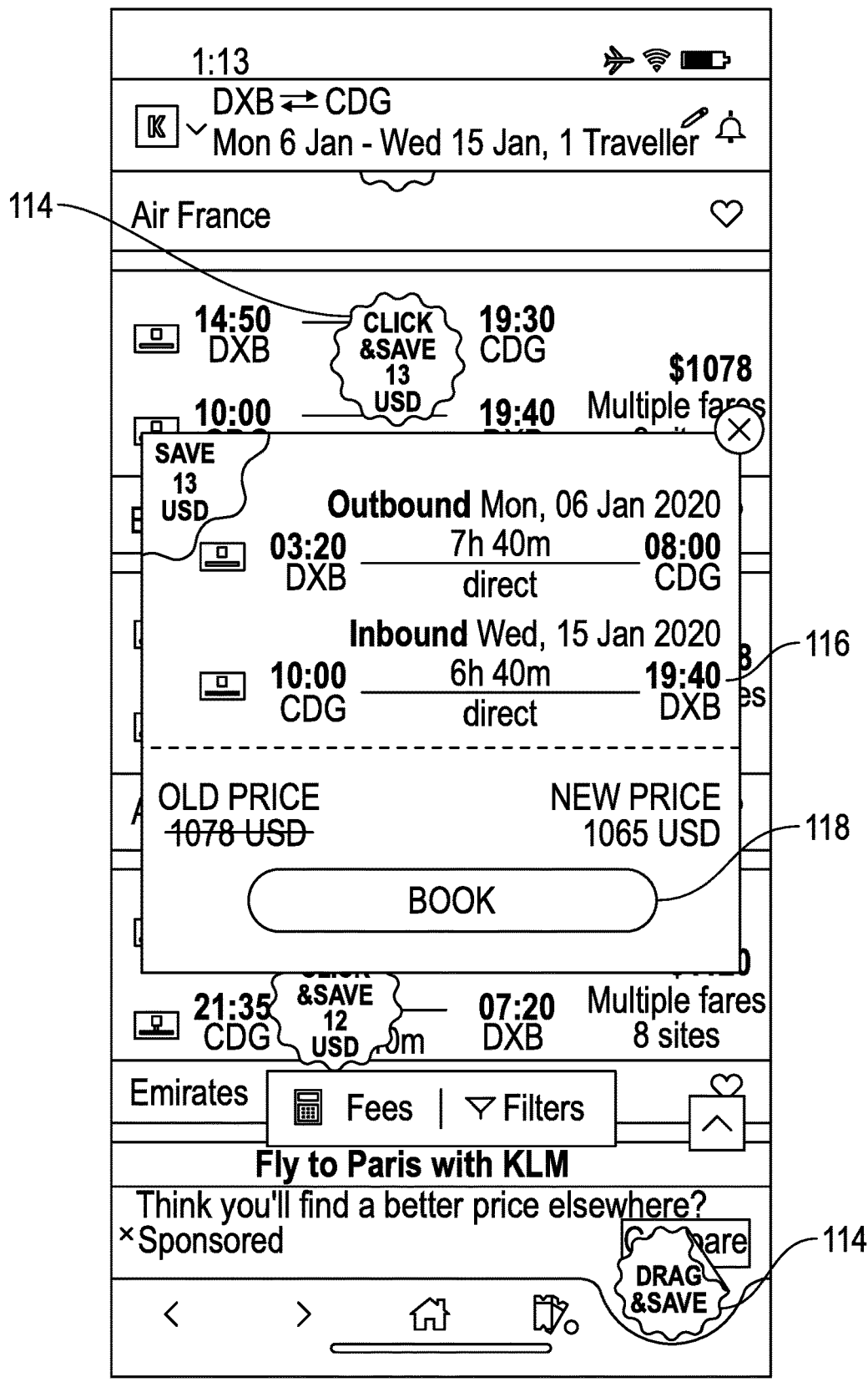
FIG. 10B is a perspective view of an exemplary embodiment of a system and method of dynamic searching, price comparison, and optimization showing a mobile application flight itinerary search page with an exemplary flight details popup.
Figure 11:
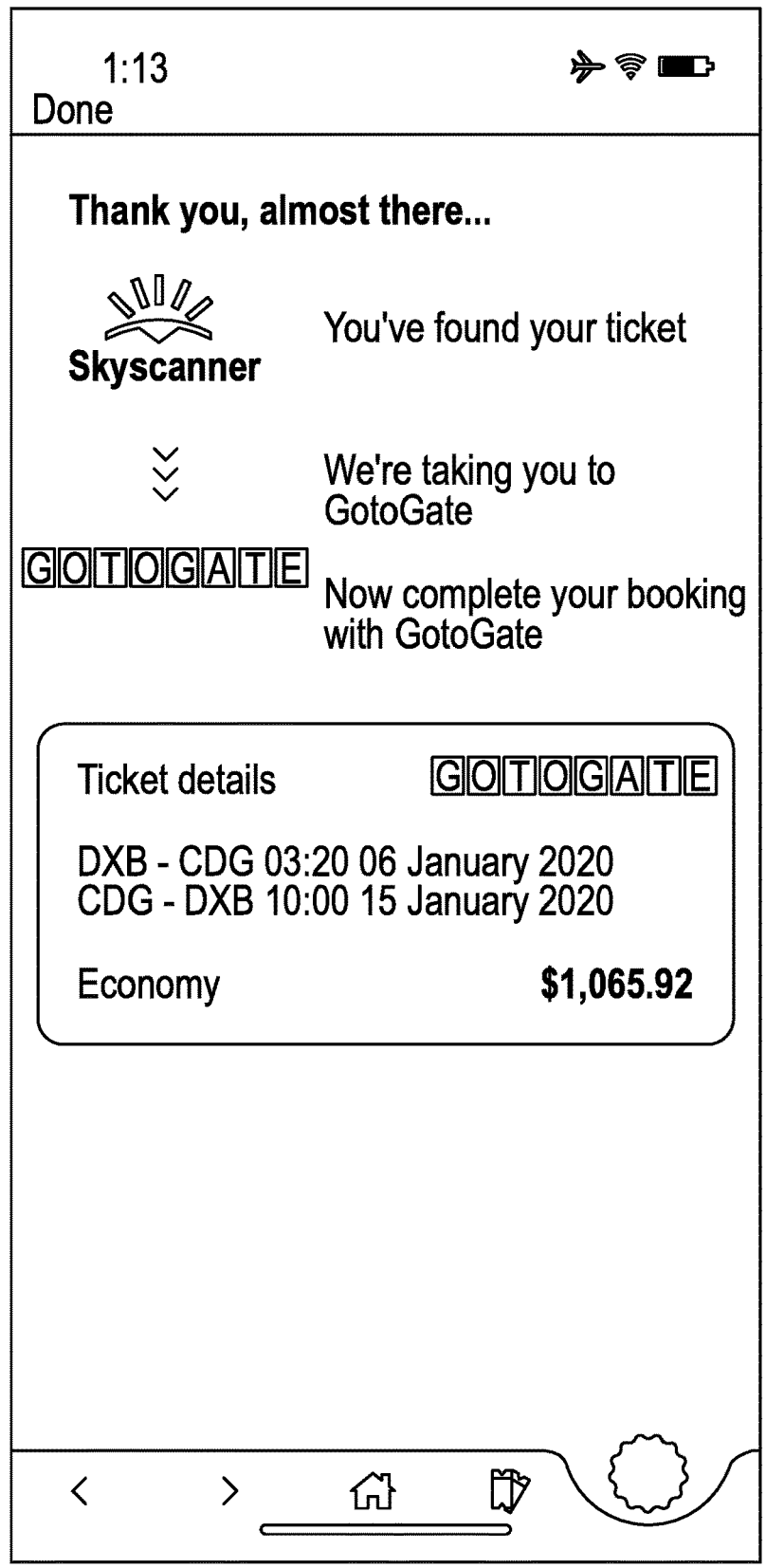
FIG. 11 is a perspective view of an exemplary embodiment of a system and method of dynamic searching, price comparison, and optimization showing a mobile application page redirecting to an OTA/aggregator webpage for booking.
Figure 12:
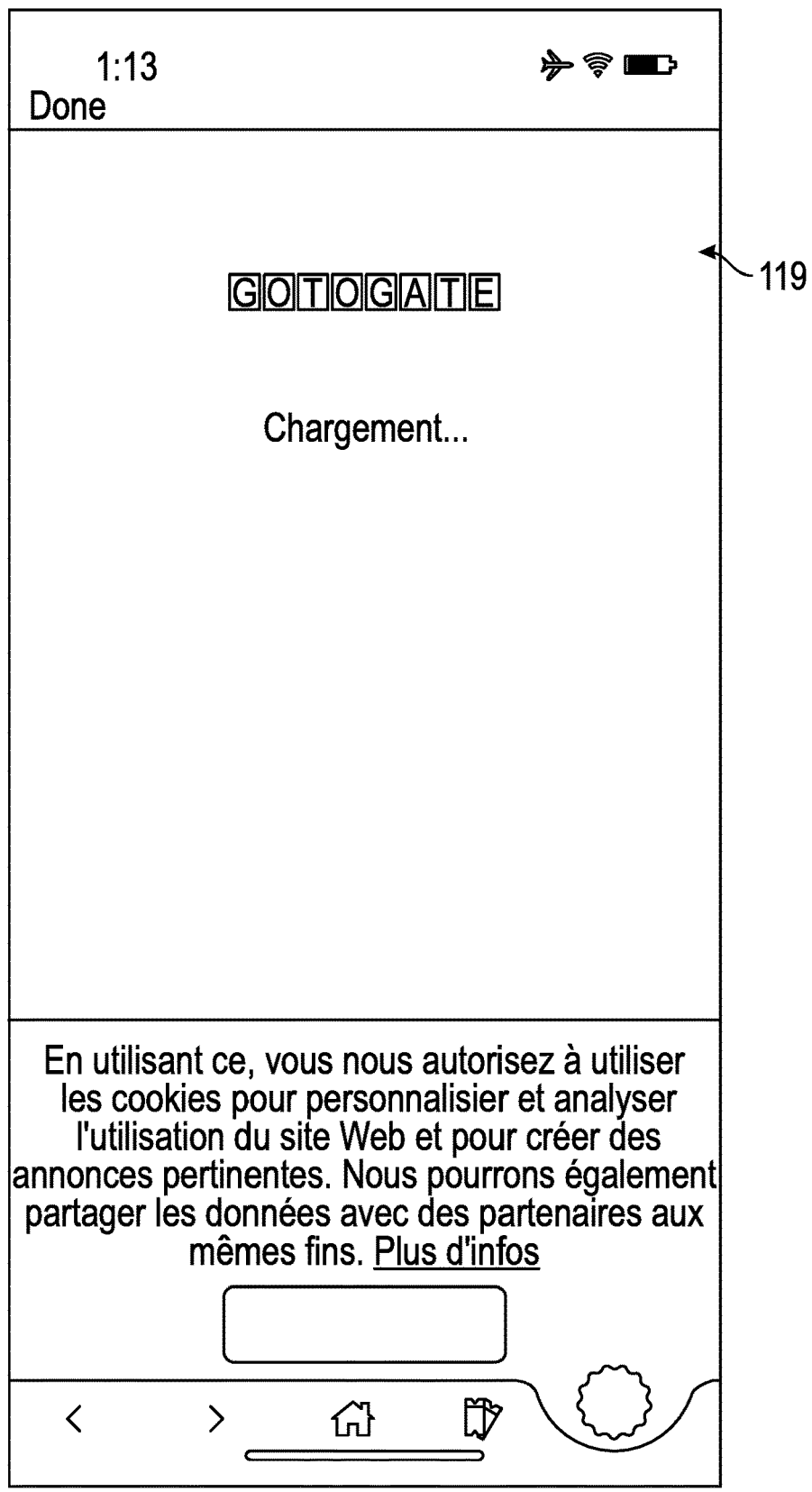
FIG. 12 is a perspective view of an exemplary embodiment of a system and method of dynamic searching, price comparison, and optimization showing a mobile application page redirecting to an OTA/aggregator webpage for booking.
Figure 13A:
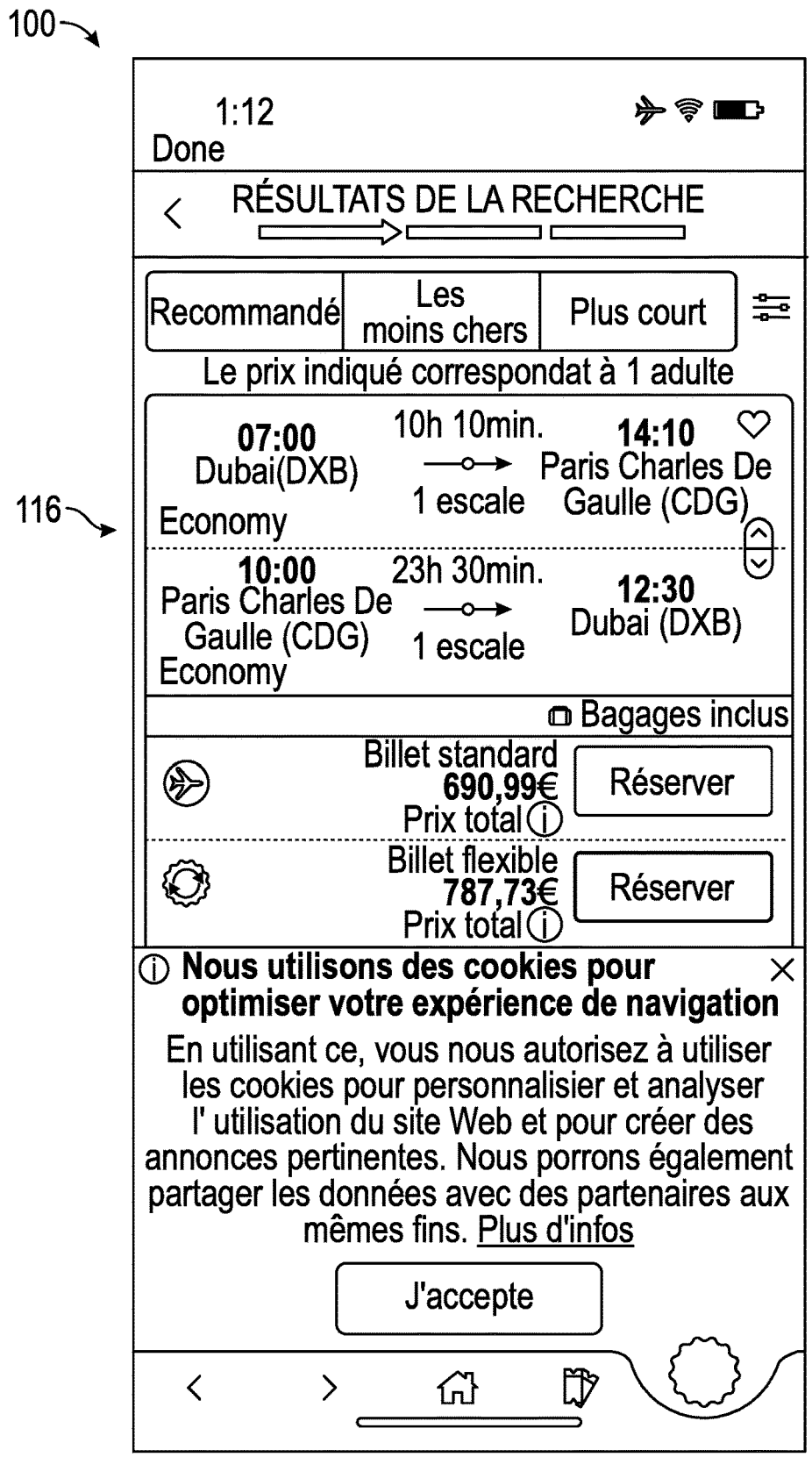
FIG. 13A is a perspective view of an exemplary embodiment of a system and method of dynamic searching, price comparison, and optimization showing a mobile application booking page.
Figure 13B:
FIG. 13B is a perspective view of an exemplary embodiment of a system and method of dynamic searching, price comparison, and optimization showing a mobile application booking page.

As best seen in FIG. 9C, the app may show the potential savings for the flight on the sticker icon 114. The user then clicks the sticker icon 114, and the app directs the user to the flight details pop-up 116 and/or a re-direction link 118 to the cheaper offer's website. The user can then book the flight for the cheapest price on that website 119, shown in FIGS. 11-13B. Translation logic is applied so that all non-English based re-direction links are automatically translated to English. As best seen in FIG. 13B, the user can toggle a Translate to English button 124 to turn off the automatic translation to see the re-direction link in his or her native language. By marking the flight with the drag and save sticker icon 114, the user automatically saves the flight details in a dedicated savings page. Participating members who allow their devices to be searched by the system may receive payments from part of the savings provided to other users. All they need to do to be eligible for these payments is to download the app to become part of the network. Members/users can create a wallet to collect those payments and spend those earnings on future travel booked through the system.

In exemplary embodiments, the user can access a page through the price details/sticker popup that shows information on how the app found a better price. It may have a dedicated "How did I get this price?" button. Some of the information provided to the user includes, but is not limited to, old and new location, language, currency, provider, device type.

Thus, it is seen that systems and methods of dynamic searching, price comparison, and optimization utilizing novel search engines are provided which allow emergency location and tracking ability. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A computer-implemented system of dynamic searching, the system including one or more personal computing devices, comprising:
    a search engine enabling searching across multiple virtual private servers in a tailored group of geographical locations;
    one or more browser extensions and caching servers handling user search requests;
    one or more databases and tracking tools comparing prices of a product or service in the tailored group of geographical locations;
    a user interface displaying a list of search results including the product or service; and
    a sticker icon on the user interface, the user interface enabling a user to drag the sticker icon over any search result to request price information for the product or service shown in the search result;
    wherein the system provides the lowest price for the product or service in the tailored group of geographical locations to a user in any geographical location.

2. The system of claim 1 wherein the one or more browser extensions are distributed over the multiple virtual private servers.

3. The system of claim 1 wherein the product or service is a travel service.

4. The system of claim 3 wherein the travel service is a flight.

5. The system of claim 1 wherein the search engine is provided via a front-end mobile application.

6. The system of claim 1 wherein when a user clicks on the sticker icon, the system directs the user to a pop-up showing the price information for the product or service.

7. The system of claim 1 wherein when a user clicks on the sticker icon, the system provides a link to a website providing the lowest price for the product or service.

8. The system of claim 1 wherein when a user clicks on the sticker icon, the system automatically saves the price information for the product or service in a dedicated savings page.

9. The system of claim 1 wherein the tailored group of geographical locations comprises geographical locations in different countries.

10. A method of price comparison and optimization, comprising:
    linking multiple virtual private servers in a tailored group of geographical locations;
    searching across the multiple virtual private servers;
    tracking and comparing prices of a product or service in the tailored group of geographical locations;
    providing the lowest price for the product or service in the tailored group of geographical locations to a user in any geographical location;
    displaying a list of search results on a user interface, the list of search results including the product or service; and
    providing a sticker icon on the user interface;
    wherein a user can drag the sticker icon over any search result to request price information for the product or service shown in the search result.

11. The method of claim 10 wherein the product or service is a flight.

12. The method of claim 11 wherein the searching is done among one or both of online travel agents or online travel aggregators and providing the lowest price includes selecting an online travel agent or online travel aggregator.

13. The method of claim 12 further comprising allowing a user to insert flight details at the selected online travel agent or online travel aggregator and browse flights.

14. The method of claim 10 wherein the tailored group of geographical locations comprises geographical locations in different countries.

15. The method of claim 10 further comprising directing a user to a pop-up showing the price information for the product or service and providing a link to a website providing the lowest price for the product or service when the user clicks on the sticker icon.

16. The method of claim 10 wherein the lowest price for the product or service in the tailored group of geographical locations is provided via a mobile application.

* * * * *